United States Patent Office 2,855,282
Patented Oct. 7, 1958

2,855,282

HYDROGEN PEROXIDE DECOLORIZATION

Joseph R. Cox and Malcolm Korach, Corpus Christi, Tex., assignors to Columbia-Southern Chemical Corporation No Drawing. Application October 14, 1955
Serial No. 540,616

9 Claims. (Cl. 23—293)

This invention relates to a novel method of preparing hydrogen peroxide solutions and is particularly directed to the problem of removing color from hydrogen peroxide solutions which are prepared by oxidation of certain organic compounds.

According to a standard method of preparing hydrogen peroxide, certain organic compounds such as quinones, normally anthraquinones such as alkylated anthraquinones, are reacted in organic solvent with hydrogen to generate the corresponding quinol. This quinol is then reacted with oxygen to liberate hydrogen peroxide and to regenerate the quinone. The resulting solution of quinone and hydrogen peroxide is then reacted with water to remove the evolved hydrogen peroxide, and the organic solution is recirculated for further hydrogenation and oxidation.

Typical quinones which are used for this purpose include: 2-ethyl anthraquinone, 2-isopropyl anthraquinone, 2-sec-butyl anthraquinone, 2-tert-butyl anthraquinone, 2-sec-amyl anthraquinone, 1,3-dimethyl anthraquinone, 2,3-dimethyl anthraquinone, 1,4-dimethyl anthraquinone, 2,7-dimethyl anthraquinone. Typical solvents used for this purpose include: benzene, toluene, alkylated naphthalene such as dimethyl naphthalene and methyl naphthalene, alcohols such as cyclohexanol, methyl cyclohexanol, diisobutyl carbinol and the like, esters such as the acetic or propionic esters of the above mentioned alcohols, ketones such as diisobutyl ketone, and the like. Typical patents describing this process include: U. S. Patents Nos. 2,158,525, 2,215,883, 2,369,912, 2,455,238, 2,495,229, 2,537,655, 2,657,980, 2,668,753, 2,673,140, 2,692,240, 2,693,998, and British Patent No. 695,779.

Another process of making hydrogen peroxide by oxidation of organic compounds involves the oxidation of hydrazoaromatic compounds. In such a process, 2-amino-5-azotoluene, 4-dimethyl amino-1-azobenzene, 2-amino-5-azoanisole, 4-aminobenzene-1-azobenzene, and like compounds are subjected to an alternate hydrogenation to produce the corresponding hydrazobenzene and to oxidation to produce hydrogen peroxide. These materials may then be extracted with water in order to remove the hydrogen peroxide and thereby permit recycling of the regenerated azobenzene to the hydrogenator. Typical patents describing this process include: U. S. Patents Nos. 2,035,101, 2,059,569, 2,083,691, 2,144,341, 2,215,656, and 2,298,064.

Various other organic compounds have been reacted with oxygen to generate hydrogen peroxide which is then extracted from the reaction mixture with water. See U. S. Patents Nos. 2,443,503, 2,479,111, 2,533,581, and 2,376,257.

The aqueous solutions resulting from such processes very frequently are colored. This coloration is not readily separated from the hydrogen peroxide solution. Consequently, when the hydrogen peroxide is purified and/or concentrated by distillation, the purified and/or concentrated hydrogen peroxide frequently is colored a straw yellow color.

According to the present invention, it has been found that the color in such hydrogen peroxide solutions may be removed readily by contacting the solutions, either before or after concentration, with a solid polymer of ethylene. This contact may be effected, for example, by permitting the hydrogen peroxide solution to percolate through a bed of pulverulent ethylene polymer. The depth of the bed may be any convenient depth necessary to achieve the results desired. Beds roughly 4 to 6 feet deep have been found to be suitable in most cases. Other convenient methods of effecting contact between the ethylene polymer and the hydrogen peroxide may be used.

Various solid ethylene polymers are suitable. Of particular interest are the polyethylene polymers known as "polythene." These polymers apparently are produced by polymerization of ethylene under high pressure and in an elevated temperature in the presence of oxygen or oxygen-containing catalyst. They normally have a molecular weight in excess of about 2000, generally in the range of 5,000 to 30,000. Such polymers normally, when fused or otherwise processed to produce sheets or other continuous structure, have unusual flexibility and are widely used in industry. The commercially available polythene molding powders may be used for the removal of color according to the present invention. It will also be understood that higher molecular weight polymers having molecular weights as high as 40,000 or even higher, as well as particles of the so-called "rigid" polyethylenes, may be used according to the present invention.

As the process proceeds, the polyethylene tends to become contaminated with the color bodies extracted or adsorbed from the hydrogen peroxide solution. The polyethylene can be purified readily by extraction with an organic solvent such as benzene, xylene, toluene, carbon tetrachloride or the like. In such a case, the solvent used should be one in which the polyethylene does not readily dissolve. The following example is illustrative:

*Example I*

2-ethyl anthraquinone and tetrahydro-2-ethyl anthraquinone were dissolved in a solvent consisting of 30 parts by volume of triethyl benzene and 70 parts by volume of methyl cyclohexyl acetate to produce a solution containing 20.8 grams of 2-ethyl anthraquinone and 35.5 grams of tetrahydro-2-ethyl anthraquinone per liter of solvent. About 100 gallons of this solution was placed in a hydrogenation chamber and circulation of further solution at the rate of 5 gallons per minute into and out of the chamber was begun. The solution was withdrawn from the hydrogenator through a filter capable of removing catalyst, and was delivered to an oxidizer. The solution was withdrawn from the oxidizer at the same rate and delivered to the bottom of a continuous extraction column, water being supplied to the top of the column. The solution coming from the top of the column was passed through a bed, several feet deep, of active alumina having a particle size of 8 to 14 mesh, and was returned to the hydrogenator.

After circulation was commenced, the hydrogenator was purged with nitrogen. Thereafter, 5 pounds of metallic palladium catalyst on bone char was suspended in the hydrogenator solution and hydrogen gas was introduced into the mixture at a rate of about 10 cubic feet per minute, measured at 760 millimeters pressure and a temperature of 70° F., effecting turbulent agitation of the mixture, suspension of the catalyst, and hydrogenation of the anthraquinone.

This process was conducted continuously by feeding in solution to the hydrogenating chamber at a rate of 5 gallons per minute and withdrawing solution containing the hydroquinone in amount equivalent to 4 to 5 grams of hydrogen peroxide per liter of solution. Further catalyst was added from time to time to maintain this rate of hydrogenation. During the hydrogenation, the solution was held at a temperature of 105° F.

The hydrogenated solution was continuously removed from the hydrogenator, filtered free of catalyst, and delivered to a reactor in which it was reacted with air at an ambient temperature of about 105 to 110° F. The oxidized solution was extracted with water in the proportion of about one part by volume of water per 30 volumes of solvent at a temperature of about 100° F. or below, a water solution containing 12 percent by weight of $H_2O_2$ being produced.

The organic solution which was saturated with water at the extraction temperature was passed through a bed of active alumina to remove entrained water, tars, and the like. The solution thus treated was heated to a temperature of about 5° F. above that at which the extraction was conducted. The heated solution was recycled to the hydrogenator for further hydrogenation, as described above.

The resulting aqueous hydrogen peroxide solution had a definitely yellow cast. This solution was distilled with rectification to produce a purified aqueous hydrogen peroxide solution containing 45 to 55 percent by weight of $H_2O_2$. This solution also had a definite yellow cast. One thousand gallons of this solution was passed through a bed of polyethylene (polythene) having a molecular weight of about 23,000 and a particle size of about ⅛ inch by ⅛ inch by ⅛ inch. The bed was about 6 inches in diameter and five feet high and the hydrogen peroxide solution was allowed to flow through the bed at the rate of about 0.08 to 0.25 liter per minute.

The resulting hydrogen peroxide solution was quite clear and colorless although it contained appreciable carbon compounds dissolved therein.

It will be understood that the above process can be performed using various other quinones or other compounds from which hydrogen peroxide can be produced. Furthermore, other solvents, such as diisobutyl ketone, nonyl alcohols, benzene or the like, may be used as the solvent or as a solvent component for the quinone or other compound subjected to hydrogenation and oxidation.

Solid, highly adsorbent ethylene polymers are found to be the most desirable material for purification of the hydrogen peroxide solution because of the high purity and chemical inertness of such materials. However, it will be understood that other hydrocarbon polymers may be used for this purpose in lieu of or in conjunction with polyethylene. Copolymers of ethylene and other hydrocarbons, such as polystyrene, fumaric acid esters, vinyl acetate, styrene, vinyl chloride or the like may be used in the practice of the above example in lieu of polyethylene. In most of such copolymers, the ethylene is the preponderant ingredient, i. e. they are copolymers formed by polymerization of a mixture in which the amount of ethylene exceeds 50, and preferably exceeds 80 to 90 percent by weight of the polymerizable components.

According to a further embodiment of the invention, other polymerized hydrocarbons and polymerized polymers and copolymers of compounds containing one or more polymerizable

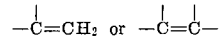

groups may be used, provided such compounds are essentially free from acidic or alkaline groups. Thus, polymers of vinyl chloride, styrene, butadiene, isobutylene, methyl methacrylate, methyl-alpha-chloroacrylate, diallyl phthalate, divinyl benzene, vinyl acetate, butadiene-styrene copolymers, and like polymers may be used to decolorize hydrogen peroxide solutions, particularly aqueous solutions in which the polymer is essentially insoluble, according to the methods described above.

The following are typical illustrations of this embodiment:

*Example II*

One hundred milliliters of hydrogen peroxide solution prepared as in Example I was passed through columns having diameters of 12 millimeters, packed respectively with particles of polyvinyl chloride of approximately 100 to 150 mesh and polymerized tetrafluoroethylene which had been shredded in a micropulverizer. The packed length of each column was 10 centimeters. As a consequence of such treatment, color was removed from the hydrogen peroxide. However, both of these resins were less effective than polyethylene.

*Example III*

One thousand milliliters of hydrogen peroxide prepared as in Example I was passed through a 50-milliliter burette packed with polyethylene powder to a depth of 10 centimeters. The color was largely removed from the hydrogen peroxide.

The polyethylene was washed with benzene until all of the yellow color was removed. The washed polyethylene was dried and used for treatment of further hydrogen peroxide for color removal. This process was repeated through four cycles of treatment, washing the resin and drying. The polyethylene was as effective in the fourth cycle as it was in the first cycle.

Although the present invention has been described with reference to the specific details of certain embodiments, it is not intended that such embodiments shall be regarded as limitations upon the scope of the invention except insofar as included in the accompanying claims.

What is claimed:

1. A method of removing color from a solution of hydrogen peroxide produced by oxidation of an organic compound, said color having been produced in the course of production of said hydrogen peroxide, which comprises contacting said solution with solid polyethylene continuing the contact until a substantial amount of the color has been removed from the solution, and recovering the solution from the polymer.

2. A method of removing color from an aqueous solution of hydrogen peroxide produced by oxidation of an organic compound which comprises contacting said solution with particles of polyethylene having a molecular weight ranging from 5000 to 30,000 continuing the contact until a substantial amount of the color has been removed from the solution, and recovering the solution from the polymer.

3. A method of removing color from a solution of hydrogen peroxide produced by oxidation of an organic compound, said color having been produced in the course of production of said hydrogen peroxide, which comprises contacting said solution with a solid polymer of an organic compound containing the polymerizable ethylenic group

said polymer being essentially free from acidic and alkaline groups continuing the contact until a substantial amount of the color has been removed from the solution, and recovering the solution from the polymer.

4. The process of claim 1 wherein the solution is an aqueous solution.

5. The process of claim 3 wherein the solution is aqueous.

6. A method of removing color from an aqueous solution of hydrogen peroxide produced by oxidation of an organic compound, and containing color produced in the course of production of said hydrogen peroxide, which comprises contacting said solution with polyethylene in particulate form until a substantial portion of the color has been removed from the hydrogen peroxide solution, and thereafter removing the hydrogen peroxide solution from the polyethylene.

7. A method of removing color from an aqueous solution of hydrogen peroxide produced by oxidation of an organic compound, and containing color produced in the course of production of said hydrogen peroxide, which comprises contacting said aqueous solution with a polymer of an organic compound containing the polymerizable ethylenic group

said polymer being essentially free from acidic and alkaline groups and being in particulate form, continuing the contact until a substantial amount of the color has been removed from the solution, and recovering the solution from the polymer.

8. A method of removing color from an aqueous solution of hydrogen peroxide produced by oxidation of an organic compound, and containing color produced in the course of production of said hydrogen peroxide, which comprises establishing a bed of particles of polyethylene and passing the solution through the bed.

9. A method of removing color from an aqueous solution of hydrogen peroxide produced by oxidation of an organic compound, and containing color produced in the course of production of said hydrogen peroxide, which comprises establishing a bed of particles of a polymer of an organic compound containing the polymerizable ethylenic group

said polymer being essentially free from acidic and alkaline groups, and passing the solution through the bed.

References Cited in the file of this patent
UNITED STATES PATENTS 2,695,217    Dunlop et al. _____ Nov. 23, 1954

OTHER REFERENCES

H. Randolph: (Koll, zeits) 1943, 103 (pp. 164–166) Chem. Abs. 1944, vol. 38(1150).

Richards: Brit. Plastics, April 1945, pp. 146–151.